(12) United States Patent
Kikuchi et al.

(10) Patent No.: US 7,889,984 B2
(45) Date of Patent: Feb. 15, 2011

(54) FOCAL POINT DETECTION DEVICE OF CAMERA AND METHOD OF DETECTING FOCAL POINT THEREOF

(75) Inventors: Tetsuo Kikuchi, Hachioji (JP); Keiji Kunishige, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 161 days.

(21) Appl. No.: 12/273,876

(22) Filed: Nov. 19, 2008

(65) Prior Publication Data

US 2009/0129766 A1    May 21, 2009

(30) Foreign Application Priority Data

Nov. 20, 2007    (JP) .............................. 2007-300730

(51) Int. Cl.
    *G03B 13/36*    (2006.01)
(52) U.S. Cl. ....................................... 396/104; 396/123
(58) Field of Classification Search ................. 396/104, 396/121–123
    See application file for complete search history.

(56) References Cited

U.S. PATENT DOCUMENTS 6,456,788 B1 *    9/2002    Otani ........................... 396/51

FOREIGN PATENT DOCUMENTS

| JP | 64-48050 | 2/1989 |
|---|---|---|
| JP | 8-262319 | 10/1996 |

\* cited by examiner

*Primary Examiner*—W. B. Perkey
(74) *Attorney, Agent, or Firm*—Straub & Pokotylo; John C. Pokotylo (57) ABSTRACT

A focal point detection device includes a focal point detection section which detects a focal point state of an object image corresponding to each of focal point detection regions. A group selection section selects focal point detection regions as a group. A judgment section determines a focal point detection region in which detection of the focal point state is enabled in the selected group. An automatic focal point detection region selection section selects, when detection of the focal point detection regions can be performed in the selected group, a focal point detection region in the selected group, and selects, when detection of the focal point detection regions cannot be performed, a focal point detection region outside the selected group. A control section drives an imaging optical system in accordance with the focal point state corresponding to the focal point detection region selected.

9 Claims, 5 Drawing Sheets

FOCAL POINT DETECTION DEVICE OF CAMERA AND METHOD OF DETECTING FOCAL POINT THEREOF

CROSS-REFERENCE TO RELATED APPLICATIONS

This application is based upon and claims the benefit of priority from prior Japanese Patent Application No. 2007-300730, filed Nov. 20, 2007, the entire contents of which are incorporated herein by reference.

BACKGROUND OF THE INVENTION

1. Field of the Invention

The present invention relates to a focal point detection device of a camera having a plurality of focal point detection regions, and a method of detecting a focal point using such a focal point detection device.

2. Description of the Related Art

A focal point detection device capable of detecting focal point state of an object image corresponding to each of a plurality of focal point detection regions in an imaging screen is known. In a focal point detection device of such a kind, in Jpn. Pat. Appln. KOKAI Publication No. 64-48050, the probability of the central focal point detection region in which the existence probability of the principal object to be imaged is high being selected is enhanced by performing focal point detection region selection in which the central focal point detection region in the imaging screen has priority to others.

Further, in Jpn. Pat. Appln. KOKAI Publication No. 8-262319, it is made possible to perform focal point detection in a focal point detection region closer to the intention of the user. In this, Jpn. Pat. Appln. KOKAI Publication No. 8-262319, the focal point detection regions provided in the imaging screen are classified into groups, and focal point detection is performed only in the focal point detection region in the group selected by the user. As a result of this, it becomes unnecessary to perform focal point detection in the entire focal point detection regions, and hence it becomes possible to quickly perform focal point detection.

BRIEF SUMMARY OF THE INVENTION

According to a first aspect of the invention, there is provided a focal point detection device of a camera comprising: an imaging optical system which is driven for focusing; a focal point detection section which detects a focal point state of an object image corresponding to each of a plurality of focal point detection regions arranged in an imaging screen; a group selection section which selects two or more focal point detection regions from the plurality of focal point detection regions as a group; a judgment section which determines a local point detection region in which detection of the focal point state of the object image by the focal point detection section is enabled in the selected group; an automatic focal point Detection region selection section which selects, when focal point detection regions in which detection, of the focal point state of the object image is enabled are present in the selected group as a result of the determination, a focal point detection region in the selected group, and selecting, when no focal point detection region in which detection of the focal point state of the object image is enabled is present in the selected group, a focal point detection region outside the selected group; and a control section which causes the imaging optical system to drive in accordance with the focal point state corresponding to the focal point detection region selected by the automatic focal point detection region selection section.

According to a second aspect of the invention, there is provided a focal point detection device of a camera comprising: an imaging optical system which is driven for focusing operation; a focal point detection section which detects a focal point state of an object image corresponding to each of a plurality of focal point detection regions arranged in an imaging screen; a group selection section which selects two or more focal point detection regions in the plurality of focal point detection regions as a group; a judgment section which determines a focal point detection region in which detection of the focal point state of the object image by the focal point detection section is enabled; an automatic focal point detection region selection section which includes a first automatic selection mode in which when focal point detection regions in which detection of the focal point state of the object image is enabled are present in the selected group as a result of the determination, a focal point detection region is selected in the selected group, and when no focal point detection region in which detection of the focal point state of the object image is enabled is present in the selected group, a focal point detection region outside the selected group is selected, and a second automatic selection mode in which it is judged, with respect to all the focal point detection regions, whether or not detection of the focal point state of the object image by the focal point detection section is enabled, and when focal point detection regions in which detection of the focal point state of the object image is enabled are present, a focal point detection region is selected from the focal point detection regions in which detection of the focal point state is enabled; a mode setting section which sets the first automatic selection mode or the second automatic selection mode as a focal point detection region selection mode; and a control section which causes the imaging optical system to drive in accordance with the focal point detection region selection mode set by the mode setting section, and in accordance with the focal point stare corresponding to the focal point detection region selected by the automatic focal point detection region selection section.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the accompanying drawings.

Figure 1:
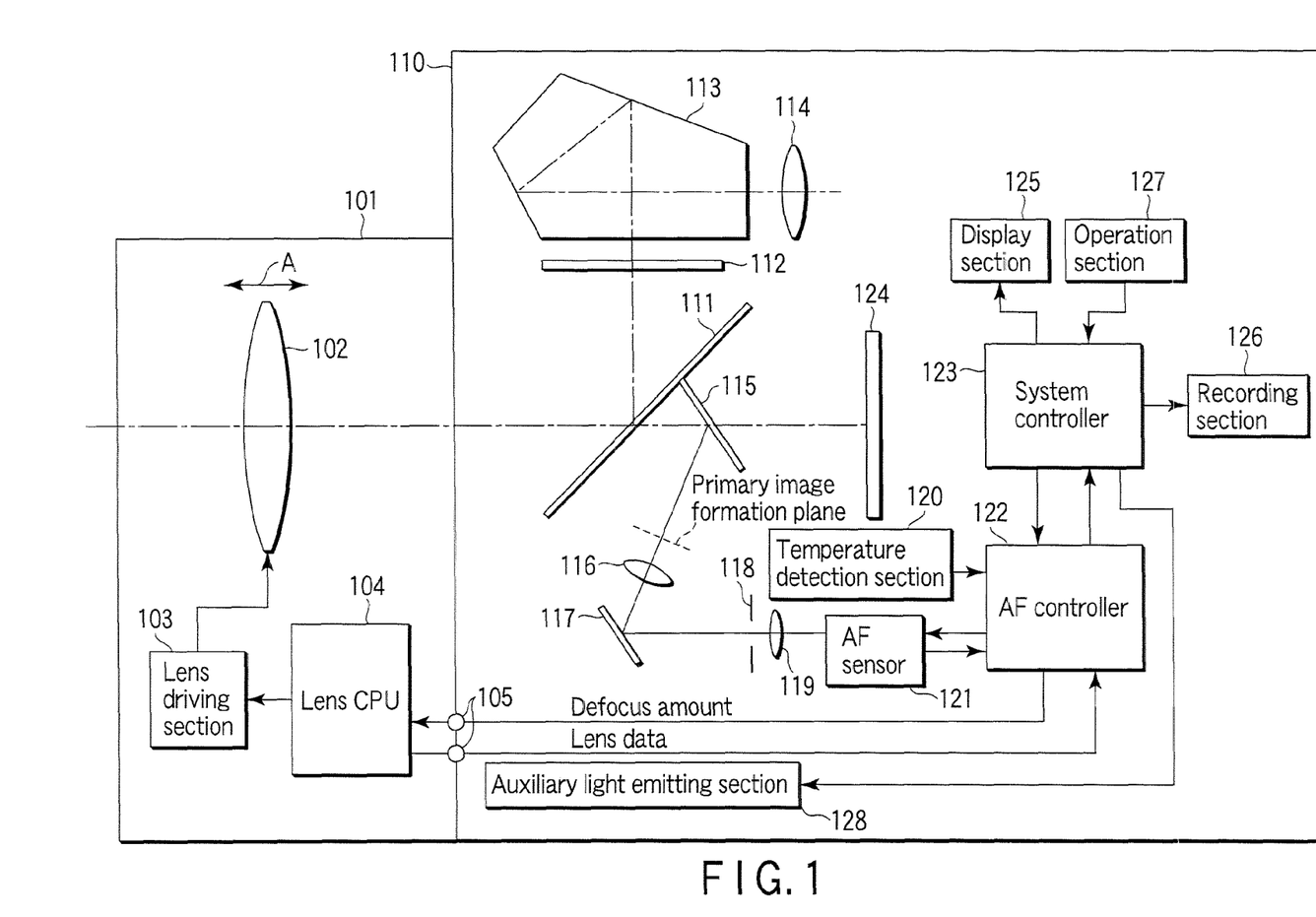
FIG. 1 is a view showing the configuration of a camera including a focal point detection device according to an embodiment of the present invention.

FIG. 1 is a view showing the configuration of a camera including a focal point detection device according to an embodiment of the present invention. The camera of FIG. 1 is shown by assuming a single-lens reflex camera with interchangeable lenses. The camera 100 includes an interchangeable lens 101 and a camera body 110. The interchangeable lens 101 is detachably attached to the camera body through a camera mount (not shown) provided in front of the camera body 110.

The interchangeable lens 101 includes a focus lens 102, a lens driving section 103, and a lens CPU 104.

The focus lens 102 is a lens for focal point adjustment included in an imaging optical system. The focus lens 102 is driven in the optical axis direction thereof (direction indicated by an arrow A in FIG. 1) by a motor provided in the lens driving section 103. Although the actual imaging optical system is constituted of a plurality of lenses, only the focus lens 102 is shown in FIG. 2. The lens driving section 103 is constituted of a motor, a motor driver, a lens driving mechanism, and the like. The lens driving section 103 drives the focus lens 102 in accordance with the control of the lens CPU 104.

The lens CPU 104 performs control of each part of the interchangeable lens 101 such as control of the lens driving section 103, and the like. When the interchangeable lens 101 is attached to the camera body 110, the lens CPU 104 is connected to an AF controller 122 inside the camera body 110 so that the lens CPU 104 can communicate with the AF controller 122 through a communication connector 105. Lens data such as manufacturing variation information of the focus lens, aberration information of the focus lens, and the like which are stored in advance in the memory of the lens CPU 104 are transmitted from the lens CPU 104 to the AF controller 122.

The camera body 110 includes a main mirror 111, a finder optical system, an AF optical system, a temperature detection section 120, an AF sensor 121, the AF controller 122, a system controller 123, an imaging element 124, a display section 125, a recording section 126, an operation section 127, and an auxiliary light emitting section 128. The finder optical system includes a focusing screen 112, a pentaprism 113, and an eyepiece 114. The AF optical system includes a submirror 115, a condenser lens 116, a total reflection mirror 117, a separator stop 118, and a separator lens 119.

The main mirror 111 is configured to be rotatable and a central part thereof is constituted of a half mirror. When in the down position (position shown in FIG. 1), the main mirror 111 reflects a part of light flux from an object (not shown) incident on the inside of the camera body 110 through the interchangeable lens 101, and transmits a part of the light flux. The light flux reflected by the main mirror 111 is image-formed on the focusing screen 112. The pentaprism 113 makes the image of the object formed on the focusing screen 112 incident on the eyepiece 114 as an erect image. The eyepiece 114 magnifies the object image from the pentaprism 113 so as to allow the user to observe the object image. By such a mechanism, the user can observe the state of the object (not shown). The submirror 115 is provided at the rear of the half mirror section of the main mirror 111. The submirror 115 reflects light flux transmitted through the half mirror part of the main mirror 111 in the direction of the AF optical system. When the main mirror 111 is in the up-position, the submirror 115 is folded.

The condenser lens 116 condenses the light flux reflected by the submirror 115 and image-formed on a primary image formation plane, and makes the condensed light flux incident on the total reflection mirror 117. The total reflection mirror 117 reflects the light flux from the condenser lens 116 toward the AF sensor 121 side.

The separator stop 118 is arranged in front of the AF sensor 121, and divides the light flux from the total reflection mirror 117. The separator lens 119 condenses the light flux divided by the separator stop 118, and forms the light flux into an image again on the AF sensor 121. The AF sensor 121 is configured by arranging pixels constituted of, for example, photodiodes, and converts the object image divided by the separator stop 118, and the separator lens 119 into an electric signal. Here, the AF sensor 121 is configured to be able to detect the focal point states in a plurality of focal point detection regions in the imaging visual field. The AF optical system, and the AF sensor will be further described later.

The AF controller 122 reads electric signals corresponding to the divided object image from the AF sensor 121, and calculates a two-image interval of the divided object image from the read electric signals by, for example, a correlation operation. Further, the AF controller 122 calculates a defocus amount at the corresponding focal point detection region from the calculated two-image interval, and transmits the calculated defocus amount to the lens CPU 104. The lens CPU 104 controls the lens driving section 103 on the basis of the defocus amount to perform focusing drive of the focus lens 102.

The system controller 123 controls operations of the entire camera of FIG. 1 such as control of the AF controller 122, processing of image signals obtained by the imaging element 124, display control of the display section 125, control of recording of images on the recording section 126, and the like.

When the main mirror 111 is in the up-position (position at which the mirror 111 is retracted from the optical axis shown in FIG. 1), the imaging element 124 converts the object image formed thereon through the focus lens 102 into an electric signal. When the object image is converted into an electric signal in the imaging element 124, the system controller 123 subjects the electric signal obtained by the imaging element 124 to various types of image processing. Further, the system controller 123 displays the image obtained by the image processing on the display section 125, and stores the image in the recording section 126. The display section 125 is a display section such as a liquid crystal display, and displays various images in accordance with the control of the system controller 123. The recording section 126 is, for example, a memory card configured to be attachable/detachable to/from the camera body 110, and various data items such as images and the like that have been subjected to image processing are recorded thereon.

The operation section 127 is constituted of various operation members including a release button for giving an instruction to start AF and an instruction to start imaging to the system controller 123, a selection button for performing various selection operations such as selection of a focal point detection region group at the time of the AF control to be described later, and the like. The auxiliary light emitting section 128 emits auxiliary light for AF in accordance with the control of the system controller 123 when the AF is impossible to be performed for the reason of low luminance or the like of the object. The auxiliary light emitting section 128 is constituted of, for example, a light emitting diode (LED) or the like.

Figure 2A:
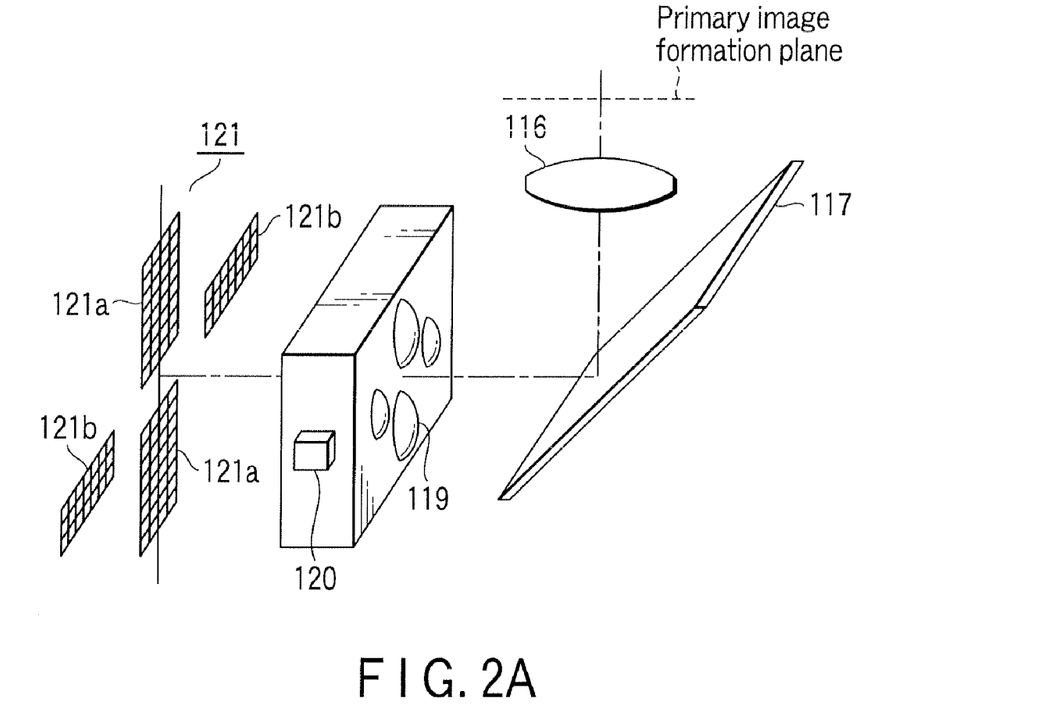
FIG. 2A is a view schematically showing a secondary image formation system of an AF optical system.

The AF optical system and the AF sensor will be described below in more detail. FIG. 2A is a view schematically showing the secondary image formation system of the AF optical system. Here, the broken line in FIG. 2A indicates the primary image formation plane, and the alternate long and short dash line indicates the optical path of the AF optical system.

As shown in FIG. 2A, the AF sensor 121 is arranged behind the separator lens 119. The AF sensor 121 in this embodiment is configured in such a manner that a horizontal line detection sensor array 121a and a vertical line detection sensor array 121b intersect with each other at right angles.

Figure 2B:
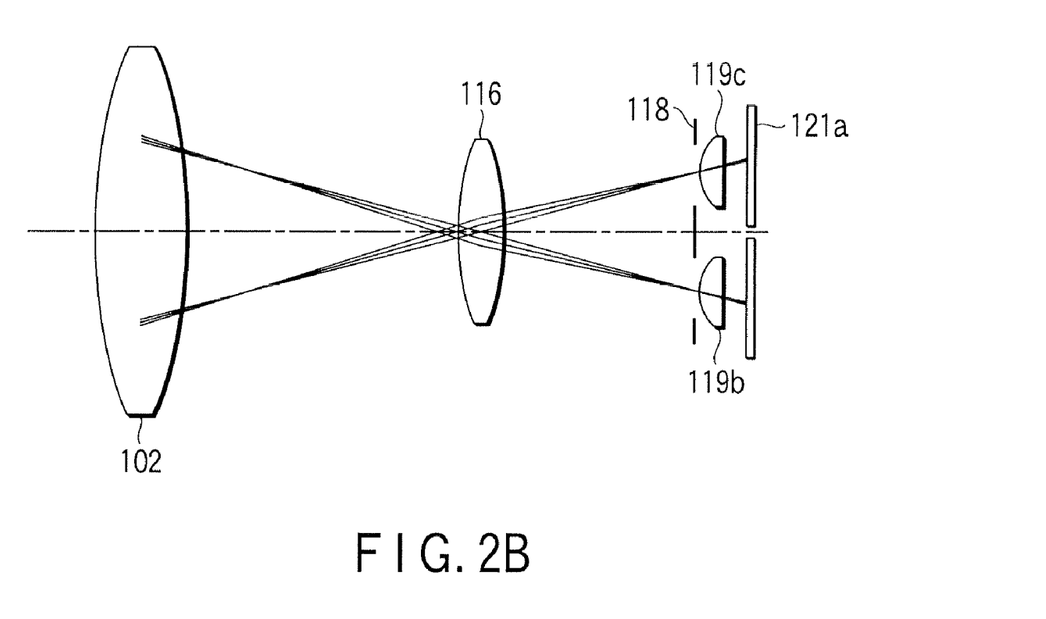
FIG. 2B is a view showing a state of light flux from a focusing lens to an AF sensor.

FIG. 2B depicts the state of the light flux from the focus lens 102 to the AF sensor. Here, in FIG. 2B, illustration of the total reflection mirror 117 for folding back the light path is omitted. Further, as for the light flux, only the horizontal line detection light flux for detecting the focal point state in the horizontal direction of the imaging screen is shown, and illustration of the vertical line detection light flux intersecting the horizontal line detection light flux at right angles is omitted. It should be noted that although the following description is intended for the horizontal line detection light flux, the description also applies to the case of the vertical line detection light flux.

In FIG. 2B, a pair of horizontal line detection light flux components passed through different exit pupils of the focus lens 102 are reflected by the submirror 115, and are thereafter made incident on the condenser lens 116 to be condensed. Further, the condensed pair of horizontal line detection light flux components are reflected by the total reflection mirror 117, and are then made incident on the separator lens 119 through the separator stop 118. Further, the horizontal line detection light flux components made incident on the separator lens 119 are image-formed on specific regions (called islands) of the horizontal line detection sensor arrays 121a arranged in the vertical direction as shown in FIG. 2A.

Next, the circuit configuration of the AF sensor 121 will be described below. In the circuit, one part of the horizontal line detection sensor arrays 121a is made to function as a base section with respect to the horizontal line detection light flux, and the other part of the arrays 121a is made to function as a reference section. Further, one part of the vertical line detection sensor arrays 121b is made to function as a base section with respect to the vertical line detection light flux, and the other part of the arrays 121b is made to function as a reference section.

Figure 3A:
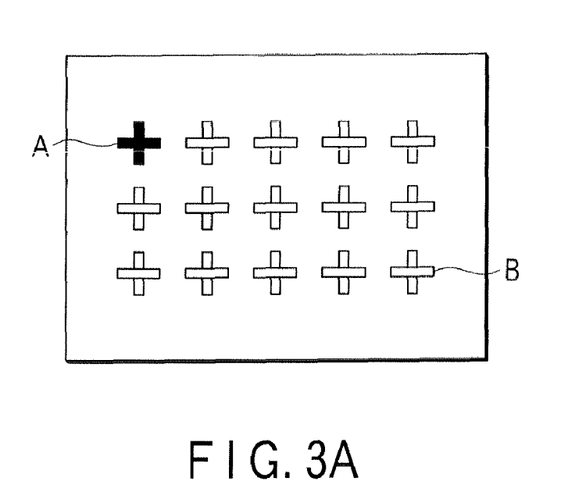
FIG. 3A is a view showing an example of an arrangement of focal point detection regions in which focal point states can be detected by the focal point detection device according to the embodiment of the present invention.
Figure 3B:
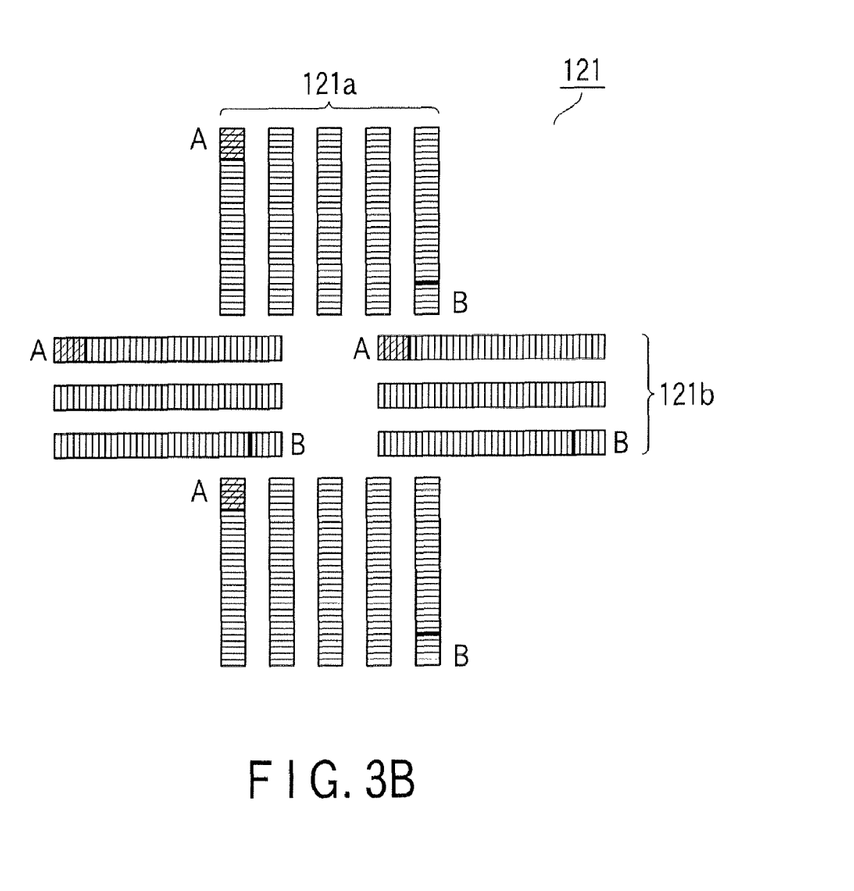
FIG. 3B is a view showing an example of an arrangement of sensor arrays for detecting focal point states of the focal point detection regions shown in FIG. 3A.

The AF sensor 121 in this embodiment is configured to be able to detect, for example, the focal point state of each of fifteen points of focal point detection regions shown in FIG. 3A. An example of an arrangement of the sensor arrays for detecting a focal point state of each of the fifteen points of the focal point detection regions is shown in FIG. 3B. In the example shown in FIG. 3B, the horizontal line detection sensor arrays 121a are configured in such a manner that five pairs of sensor arrays are arranged in parallel with each other at regular intervals. Further, the vertical line detection arrays 121b are configured in such a manner that three pairs of sensor arrays are arranged in parallel with each other at regular intervals.

In the arrangement of the sensor arrays shown in FIG. 3B, the light flux based on the object image corresponding to, for example, the focal point detection region A of FIG. 3A is image-formed on the pixels in the region (island) indicated by A of FIG. 3B. Further, the light flux based on the object image corresponding to, for example, the focal point detection region B of FIG. 3A is image-formed on the pixels in the region (island) indicated by B of FIG. 3B.

Electric signals from the AF sensor 121 configured as described above are input to the AF controller 122. The AF controller 122 converts the electric signals input from the AF sensor 121 into digital signals by means of an A/D converter incorporated in the AF controller, and then holds the digital signals in an internal memory as data (sensor data). Thereafter, the AF controller 122 detects the focal point state of each of the focal point detection regions on the basis of the held sensor data. The detection of the focal point state is performed by using, for example, the method of a correlation operation.

Figure 4:
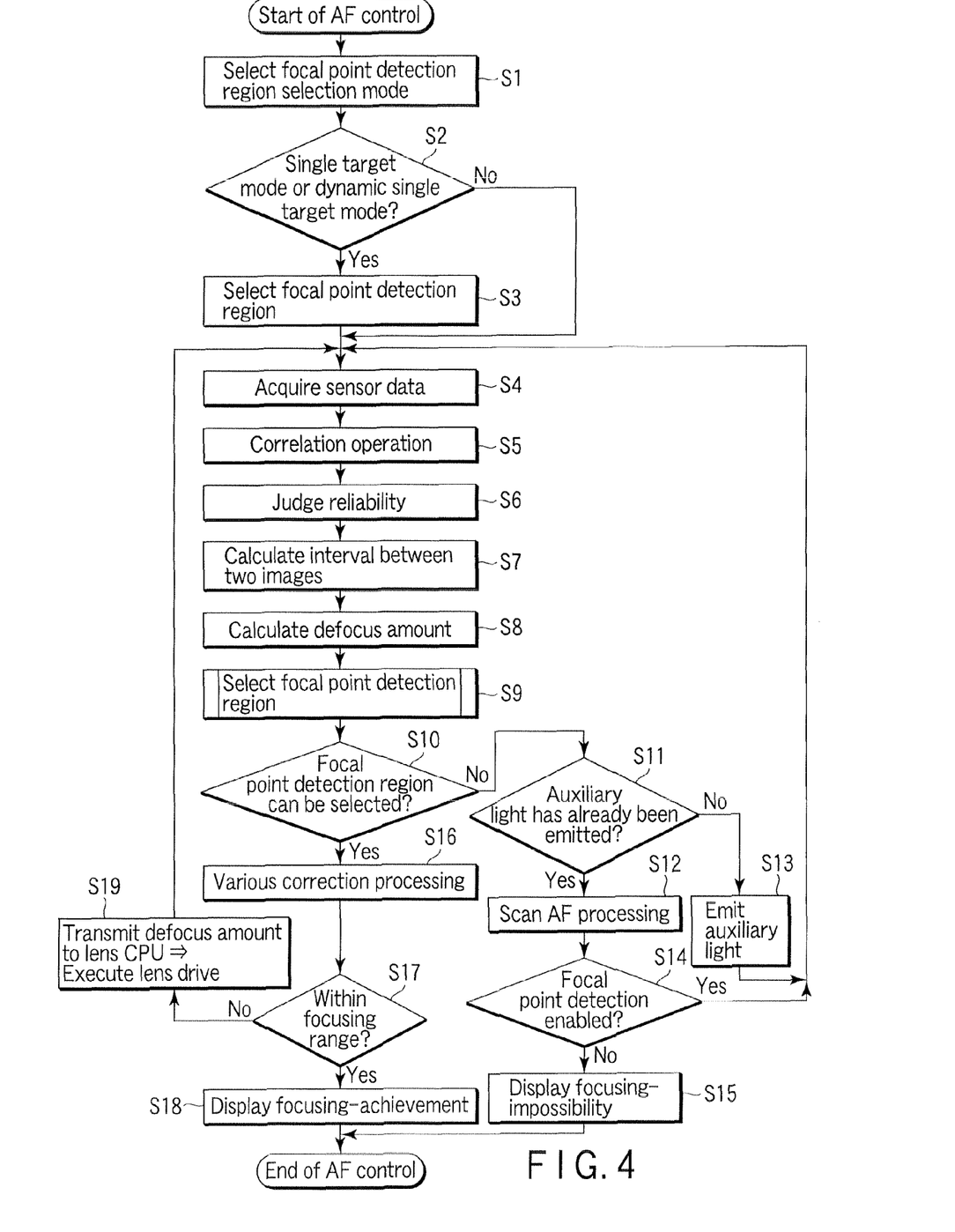
FIG. 4 is a flowchart showing a control operation to be performed at the time of AF in the embodiment of the present invention.

Next, the control operation to be performed at the time of AF will be described below. FIG. 4 is a flowchart showing the control operation to be performed at the time of AF in this embodiment.

Prior to the AF, first, the system controller 123 causes the user to select the focal point detection region selection mode (step S1). In this embodiment, it is assumed, as an example, that one focal point detection region selection mode can be selected from those including a single target mode, an all target mode, and a dynamic single target mode.

The single target mode is a mode in which a defocus amount of a focal point detection region selected in advance by the user is selected from the defocus amounts of the respective focal point detection regions calculated by the AF controller 122, and thereafter a lens drive for focusing is performed. Further, the all target mode is a mode in which a defocus amount that is highly reliable among the defocus amounts of the focal point detection regions calculated by the AF controller 122 and is a defocus amount of a focal point detection region in the closest vicinity of which the object is present is selected, and thereafter a lens drive for focusing is performed. Further, the dynamic single target mode is a mode in which a defocus amount of a focal point detection region in the group selected by the user is basically used, and when a focal point cannot be detected in the focal point detection region in the group, a focusing operation is performed by using a defocus amount of a focal point detection region outside the group. The dynamic single target mode will be described later in detail.

In step S1, when the focal point detection region selection mode is selected by the user, the system controller 123 judges whether the focal point detection region selection mode selected by the user is the single target mode or the dynamic single target mode (step S2). When the focal point detection region selection mode is the single target mode or the dynamic single target mode in the judgment of step S2, the system controller 123 causes the user to select a focal point detection region or a focal point detection region group (step S3). Thereafter, the system controller 123 instructs the AF controller 122 to execute the AF of step S4 and subsequent to step S4. Further, when the focal point detection region selection mode is the all target mode in the judgment of step S2, the system controller 123 instructs the AF controller 122 to skip the processing of step S3, and execute the AF of step S4 and subsequent to step S4.

Upon receipt of the instruction to execute the AF from the system controller 123, first the AF controller 122 acquires sensor data of the respective focal point detection regions from the output signals of the AF sensor 121, and stores the data in the memory (step S4).

Subsequently, the AF controller 122 performs a correlation operation (step S5). The correlation operation in this case is an operation for calculating, for example, an interval between two images made incident on a part between the sensor arrays in which the base section and the reference section form a pair. When the reliability of the correlation operation result is low, there is the possibility of an erroneous defocus amount being calculated, and hence the AF controller 122 judges the reliability of the sensor data to be used for the correlation operation prior to performing calculation of the defocus amount (step S6). Thereafter, the AF controller calculates an interval between two images that minimizes the correlation value from the result of the correlation operation (step S7) Further, the AF controller 122 calculates a defocus amount from the calculated interval between two images by using an optically calculated defocus coefficient (step S8).

After the calculation of the defocus amount, the AF controller 122 performs selection of the focal point detection region in accordance with the focal point detection region selection mode of the camera (step S9). When the focal point detection region selection mode is the single target point mode, the focal point detection region specified by the user is used. Further, when the focal point detection region selection mode is the all target mode, focal point detection regions that output sensor data of a high degree of reliability among all the focal point detection regions are extracted, and from these, a focal point detection region in the closest vicinity of the object is further selected. The case of the dynamic single target mode will be described later.

Subsequently, the AF controller 122 judges in step S10 whether or not the focal point detection region selection has been performed (step S10). For example, when there is no focal point detection region of a high degree of reliability in the reliability judgment in step S6, it is judged that the focal point detection region selection has not been performed. When the focal point detection region selection cannot be performed in the judgment of step S10, the AF controller 122 notifies the system controller 123 of the fact. Prior to the notification, the system controller 123 has already judged whether or not the auxiliary light emitting section 128 has not emitted light at that time (step S11). When the auxiliary light emitting section has already emitted light in the judgment of step S11, the system controller 123 instructs the AF controller 122 to execute scan AF (step S12). On the other hand, when the auxiliary light emitting section 128 has not emitted light yet in the judgment of step S11, the system controller 123 instructs the auxiliary light emitting section to emit auxiliary light (step S13). After that, the system controller instructs the AF controller 122 to perform an operation of the defocus amount again.

When the scan AF is performed, the AF controller 122 judges whether or not focal point detection can be correctly performed as a result of the scan AF (step S14). When the focal point detection can be performed correctly in the judgment of step S14, the flow is returned to step S4, and the operation of the defocus amount is performed again. On the other hand, when the focal point detection cannot be correctly performed in the judgment of step S14, it is judged that the focal point detection cannot be correctly performed in the end. In this case, the AF controller 122 notifies the system controller 123 that the focal point detection has not been able to be correctly performed. Upon receipt of this notification, the system controller 123 performs display of focusing-impossibility in, for example, the finder (step S15), and terminates the processing shown in FIG. 4.

On the other hand, when the selection of the focal point detection region can be correctly performed in the judgment of step S10, the AF controller 122 subjects the defocus amount of the selected focal point detection region to various correction processing such as temperature correction, correction for variation in the camera body 110 at the time of manufacture thereof, correction for variation in the focus lens 102 at the time of manufacture thereof, and the like, and determines the final defocus amount (step S16). After the final defocus amount has been determined, the AF controller 122 judges whether or not the final defocus amount is within a predetermined focusing range (step S17).

When the final defocus amount is within the predetermined focusing range in the judgment of step S17, the AF controller 122 notifies the system controller 123 of the fact. Upon receipt of the notification, the system controller 123 performs display of focusing-achievement in, for example, the finder (step S18), and terminates the processing shown in FIG. 4. On the other hand, when the final defocus amount is not within the predetermined focusing range in the judgment of step S17, the AF controller 122 transmits the calculated defocus amount to the lens CPU 104. The lens CPU 104 controls the lens driving section 103 on the basis of the defocus amount transmitted thereto, whereby the focusing drive of the focus lens 102 is performed (step S19). This lens drive is repeated until the defocus amount becomes within the focusing range in step S17.

Figure 5:
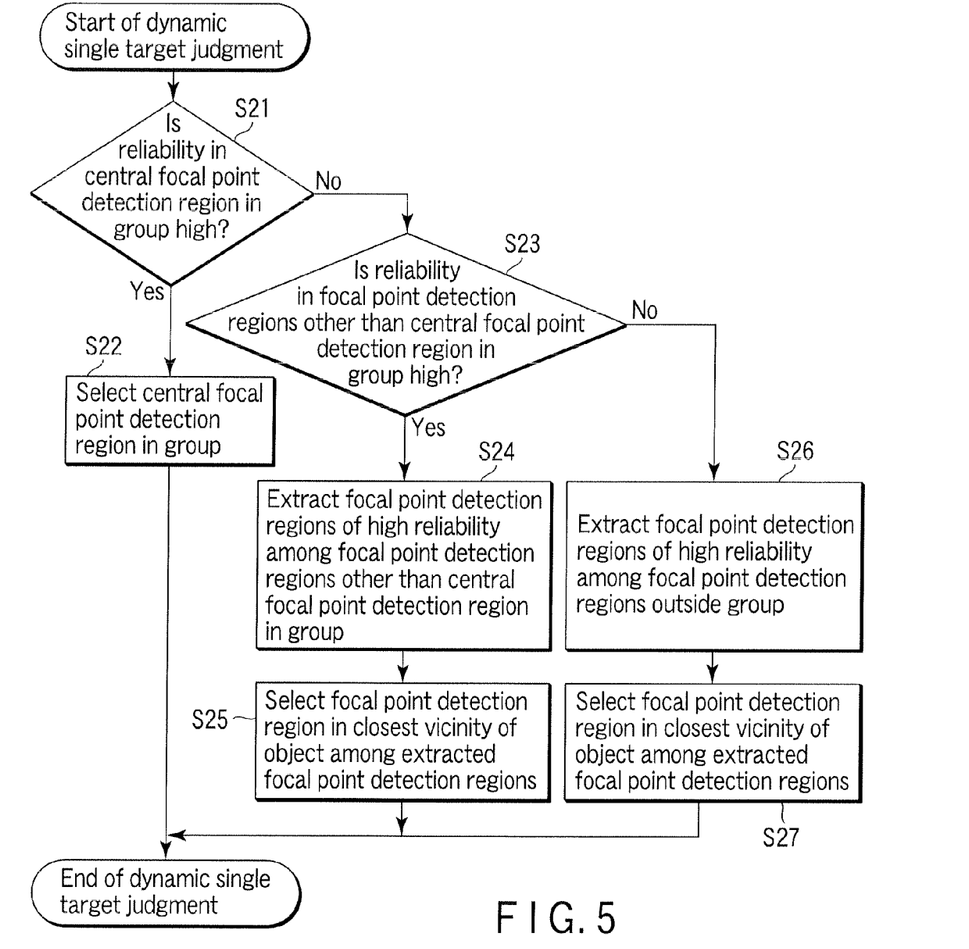
FIG. 5 is a flowchart showing a process of selection of a focal point detection region to be performed at the time of a dynamic single target mode.

Next, the focal point detection region selection to be performed in the case of the dynamic single target mode will be described below. FIG. 5 is a flowchart showing the processing of the focal point detection region selection to be performed at the time of the dynamic single target mode.

In FIG. 5, first, the AF controller 122 judges whether or not the reliability of the sensor data in the central focal point detection region of the group selected by the user is high (step S21). When the reliability of the sensor data in the central focal point detection region is high in the judgment of step S21, the AF controller 122 selects the central focal point detection region in the group (step S22).

Further, when the reliability of the sensor data in the central focal point detection region is low in the judgment of step S21, the AF controller 122 judges whether or not there are focal point detection regions in which the reliability of the sensor data is high in the focal point detection regions other than the central focal point detection region in the group (step S23). When there are focal point detection regions in which the reliability of the sensor data is high in the focal point detection regions other than the central focal point detection region in the group in the judgment of step S23, the AF controller 122 extracts the focal point detection regions of the high reliability (step S24). After that, the AF controller 122 selects a focal point detection region having the shortest object distance among the extracted focal point detection regions, i.e., the focal point detection region in the closest vicinity of the object (step S25).

Further, when there is no focal point detection region in which the reliability of the sensor data is high among the focal point detection regions other than the central focal point detection region in the group in the judgment of step S23, the AF controller 122 extracts focal point detection regions in which the reliability of the sensor data is high among the focal point detection regions outside the group selected by the user (step S26). Thereafter, the AF controller 122 selects a focal point detection region having the shortest object distance among the extracted focal point detection regions, i.e., the focal point detection region in the closest vicinity of the object (step S27). When there is no focal point detection region in which the reliability of the sensor data is high in the focal point detection regions outside the selected group, it is judged in the judgment of step S10 of FIG. 4 that selection of the focal point detection region has not been enabled.

Figure 6:
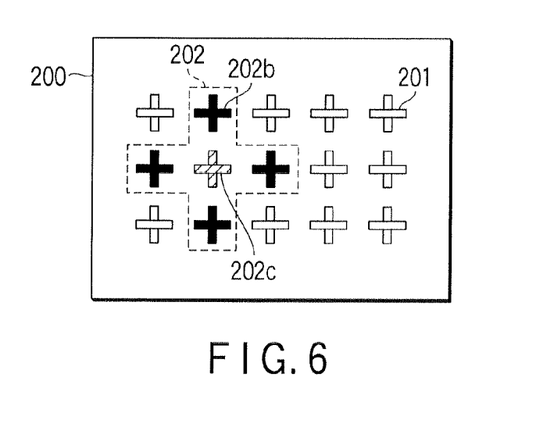
FIG. 6 is a view for explaining selection of a focal point detection region to be performed at the time of the dynamic single target mode.

The operation of FIG. 5 will be described below with reference to FIG. 6. FIG. 6 shows a state where fifteen focal point detection regions 201 are arranged in the imaging screen 200, and it is assumed that a focal point detection region group 202 has been selected by the user. It should be noted that the shape of the focal point detection region group is not limited to the shape shown in FIG. 6, and can be arbitrarily set by the user.

First, it is judged whether or not the reliability of the sensor data in the central focal point detection region 202c in the focal point detection region group 202 is high. Further, when the reliability of the sensor data in the focal point detection region 202c is high, the focal point detection region 202c is selected. The central focal point detection region 202c of the focal point detection region group 202 is the focal point detection region in which the existence probability of the principal object to be imaged is the highest in a range in which the user desires to achieve focusing preferentially. Accordingly, when the reliability of the sensor data in the focal point detection region 202c is high, the focal point detection region 202c is preferentially selected.

Further, when the reliability of the sensor data in the central focal point detection region 202c of the focal point detection region group 202 is low, if lens drive for focusing is performed with respect to the focal point detection region 202c, there is the possibility of incorrect lens drive being performed. For this reason, it is judged whether or not the reliability of the sensor data is high with respect to the focal point detection regions 202b other than the central focal point detection region 202c of the focal point detection region group 202. Further, a focal point detection region in the closest vicinity of the object is selected from the focal point detection regions in which the reliability of the sensor data is high in the focal point detection region group 202. A focal point detection region can be considered to sufficiently reflect the user's intention as long as the focal point detection region is a focal point detection region in the focal point detection region group 202. In this case, even when the reliability of the sensor data in the focal point detection region 202c is low, a focal point detection region in the focal point detection region group 202 is selected.

Further, when the sensor data in all the focal point detection regions in the focal point detection region group 202 are low, a focal point detection region in the closest vicinity of the object is selected from the focal point detection regions in which the reliability of the sensor data is high outside the focal point detection region group 202. In this case, although a case where the object is different from that intended by the user is considered, a release operation is enabled by performing lens drive so as not to miss a perfect moment for a good shot.

As has been described above, according to this embodiment, by setting a focal point detection region group, a focal point detection region to which importance is arbitrarily attached by the user can be set, and even when a principal object to be imaged is not present in the focal point detection region set by the user, lens drive for focusing is performed for an object to be imaged present in a focal point detection region in which the reliability of the sensor data is high. Accordingly, the perfect moment for a good shot is never missed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focal point detection device of a camera comprising:
an imaging optical system which is driven for focusing;
a focal point detection section which detects a focal point state of an object image corresponding to each of a plurality of focal point detection regions arranged in an imaging screen;
a group selection section which selects two or more focal point detection regions from the plurality of focal point detection regions as a group;
a judgment section which determines a focal point detection region in which detection of the focal point state of the object image by the focal point detection section is enabled in the selected group;
an automatic focal point detection region selection section which selects,
when focal point detection regions in which detection of the focal point state of the object image is enabled are present in the selected group as a result of the determination, a focal point detection region in the selected group, wherein selecting the focal point detection region in the selected group includes selecting a central focal point detection region when the central focal point detection region is included in the focal point detection regions, and
when no focal point detection region in which detection of the focal point state of the object image is enabled is present in the selected group, a focal point detection region outside the selected group; and
a control section which causes the imaging optical system to drive in accordance with the focal point state corresponding to the focal point detection region selected by the automatic focal point detection region selection section.

2. The focal point detection device of a camera according to claim 1, wherein the automatic focal point detection region selection section selects, when focal point detection regions in which detection of the focal point state of the object image is enabled are present in the selected group, a focal point detection region corresponding to the smallest distance from an object among the focal point detection regions in the selected group.

3. The focal point detection device of a camera according to claim 1, wherein the automatic focal point detection region selection section selects, when no focal point detection region in which detection of the focal point state of the object image is enabled is present in the selected group, a focal point detection region corresponding the smallest distance from an object among the focal point detection regions outside the group.

4. The focal point detection device of a camera according to claim 1, wherein the focal point detection section is configured to detect focal point states of the object image in the different directions.

5. A focal point detection device of a camera comprising:
an imaging optical system which is driven for focusing operation;
a focal point detection section which detects a focal point state of an object image corresponding to each of a plurality of focal point detection regions arranged in an imaging screen;
a group selection section which selects two or more focal point detection regions in the plurality of focal point detection regions as a group;
a judgment section which determines a focal point detection region in which detection of the focal point state of the object image by the focal point detection section is enabled;
an automatic focal point detection region selection section which includes
a first automatic selection mode in which
when focal point detection regions in which detection of the focal point state of the object image is enabled are present in the selected group as a result of the determination, a focal point detection region is selected in the selected group, wherein selecting the focal point detection region in the selected group includes selecting a central focal point detection region when the central focal point detection region is included in the focal point detection regions, and
when no focal point detection region in which detection of the focal point state of the object image is enabled is present in the selected group, a focal point detection region outside the selected group is selected, and
a second automatic selection mode in which it is judged, with respect to all the focal point detection regions, whether or not detection of the focal point state of the object image by the focal point detection section is enabled, and when focal point detection regions in which detection of the focal point state of the object image is enabled are present, a focal point detection region is selected from the focal point detection regions in which detection of the focal point state is enabled;
a mode setting section which sets the first automatic selection mode or the second automatic selection mode as a focal point detection region selection mode; and
a control section which causes the imaging optical system to drive in accordance with the focal point detection region selection mode set by the mode setting section, and in accordance with the focal point state corresponding to the focal point detection region selected by the automatic focal point detection region selection section.

6. The focal point detection device of a camera according to claim 5, wherein when the mode setting section sets the focal point detection region selection mode at the first automatic selection mode, and focal point detection regions in which detection of the focal point state of the object image is enabled are present in the selected group, the automatic focal point detection region selection section selects a focal point detection region corresponding to the smallest distance from an object among the focal point detection regions in the selected group.

7. The focal point detection device of a camera according to claim 5, wherein when the mode setting section sets the focal point detection region selection mode at the first automatic selection mode, and no focal point detection region in which detection of the focal point state of the object image is enabled is present in the selected group, the automatic focal point detection region selection section selects a focal point detection region corresponding the smallest distance from an object among the focal point detection regions outside the group.

8. The focal point detection device of a camera according to claim 5, wherein the focal point detection section is configured to detect a focal point state of the object image in the different direction.

9. A method of detecting a focal point state of an imaging optical system corresponding to a plurality of focal point detection regions in an imaging screen, comprising:
detecting a focal point state of an object image corresponding to each of the plurality of focal point detection regions arranged in the imaging screen;
selecting two or more focal point detection regions from the plurality of focal point detection regions as a group;
determining a focal point detection region in which detection of the focal point state of the object image is enabled in the selected group;
selecting,
when focal point detection regions in which detection of the focal point state of the object image is enabled are present in the selected group, a focal point detection region in the selected group, wherein selecting the focal point detection region in the selected group includes selecting a central focal point detection region when the central focal point detection region is included in the focal point detection regions, and
when no focal point detection region in which detection of the focal point state of the object image is enabled is present in the selected group, a focal point detection region outside the selected group; and
causing the imaging optical system to drive in accordance with the focal point state corresponding to the selected focal point detection region.

* * * * *